United States Patent [19]

Bhat et al.

[11] Patent Number: 5,753,143
[45] Date of Patent: May 19, 1998

[54] PROCESS FOR THE $CO_2$ REFORMING OF METHANE IN THE PRESENCE OF RHODIUM ZEOLITES

[75] Inventors: Ramanath Bhat; Wolfgang Max Hugo Sachtler, both of Evanston, Ill.

[73] Assignee: Northwestern University, Evanston, Ill.

[21] Appl. No.: 618,051

[22] Filed: Mar. 25, 1996

[51] Int. Cl.⁶ ................................................ C07C 1/02
[52] U.S. Cl. ......................................................... 252/373
[58] Field of Search ............................................. 252/373

[56] References Cited

U.S. PATENT DOCUMENTS 3,702,886  11/1972  Argauer et al. .................... 423/328

FOREIGN PATENT DOCUMENTS 9211199  7/1992  WIPO.
9301130  1/1993  WIPO.

OTHER PUBLICATIONS

Bibby et al–Studies in Surface Science & Catalysis v36, 1988, pp. 67–71, 1988.
Masai et al;Studies in Surface Science and Catalysis;vol. 36;pp. 67–71 (Editors: Bibby et al), 1988.

Primary Examiner—Gary Geist
Assistant Examiner—Sreeni Padmanabhan
Attorney, Agent, or Firm—Keith D. Gourley

[57] ABSTRACT

The present invention relates to a process for the carbon dioxide reforming of methane in the presence of a catalyst to produce a synthesis gas comprising hydrogen and carbon monoxide. The process utilizes a catalyst and reducing agent which under appropriate process conditions can accomplish the $CO_2$ reforming of methane in the absence of steam. The process includes contacting methane and $CO_2$ in the presence of an effective amount of rhodium incorporated into a natural or synthetic crystalline zeolite having a silicon to aluminum ratio of greater than or equal to about 1.0 under reforming conditions sufficient to convert $CH_4$ to synthesis gas.

11 Claims, 2 Drawing Sheets

TEST FOR THE STABILITY OF 0.1% Rh/NaY IN CH$_4$ +CO$_2$ REACTION

PROCESS FOR THE CO₂ REFORMING OF METHANE IN THE PRESENCE OF RHODIUM ZEOLITES

TECHNICAL FIELD OF THE INVENTION

This invention relates to a process for producing synthesis gas by the carbon dioxide reforming of methane in the presence of a catalyst.

BACKGROUND OF THE INVENTION

Production of synthesis gas or syngas (mixtures comprising hydrogen and carbon monoxide) is an important first process step in the manufacture of numerous chemicals including ammonia and methanol. Most of the synthesis gas plants built today are based on steam reforming of hydrocarbons and typically employ the catalytic steam reforming of methane in the presence of supported nickel catalysts, usually Ni/Al₂O₃, by the reaction:

$$CH_4 + H_2O = CO + 3H_2 \qquad (1)$$

For a variety of reasons including prevention of reformer catalyst coking, an excess of steam is generally used which drives the water gas shift reaction (WGSR), namely:

$$CO + H_2O = CO_2 + H_2 \qquad (2)$$

As a result, the syngas product usually has a H₂/CO ratio far greater than three which is the ratio predicted by reaction (1) alone. This is desirable if the hydrogen in the syngas is intended for the manufacture of ammonia.

A different situation exists, however, if the syngas is to be used in the production of methanol which requires lower H₂/CO ratios in the syngas. This reaction is represented by the equation CO+2H₂=CH₃OH. The desired composition of a syngas for a methanol synthesis loop should have a Stoichiometric Number (SN) of 2.05 to 2.06 where the SN defines the composition as:

$$SN = (H_2 - CO_2)/(CO + CO_2)$$

A syngas having a SN<2 leads to undesirable byproducts in the production of methanol (e.g., higher alcohols). A higher SN number results in a less efficient and more expensive plant due to the increased amount of synthesis gas to be handled. Syngas with a H₂/CO ratio of two or a stoichiometric number in the desired range, however, cannot be produced by simple steam reforming alone.

Although lower H₂/CO ratio syngas mixtures desirable for methanol production can be achieved by replacing steam in reaction (1) with carbon dioxide:

$$CH_4 + CO_2 = 2CO + 2H_2 \qquad (3)$$

thermodynamic calculations show that the carbon limits are approached when carbon dioxide is added to the reformer feed. With high CO₂ contents in the feedgas under conditions of low steam content or when operating with carbon dioxide and methane alone, thermodynamics predict the formation of carbon by the Boudouard reaction:

$$2CO = CO_2 + C \qquad (4)$$

On nickel catalysts, this results in the formation of carbon whiskers via a mechanism believed to involve the dissolution of adsorbed carbon atoms in the nickel crystal and nucleation of the whisker from Ni-surfaces. Whisker growth not only leads to catalyst poisoning, but also to pore plugging, a rather dangerous phenomenon as it results in build-up of gas pressure to excessive or dangerous levels. Nickel also reacts with carbon monoxide at low temperatures and forms nickel tetracarbonyl, a very toxic compound. As a result, currently many syngas manufacturers use a "combined reformer" which combines a steam reformer with a second reactor. This second reactor is typically an oxygen or air-fired "autothermal reformer" in which methane is basically burned to produce a CO₂-rich and H₂-poor combustion product which is added to the product of the steam reformer to obtain the gas make-up required for methanol production. This two-reactor process, however, is a wasteful and costly solution to the problem of obtaining syngas with the desired Stoichiometric Number.

Prior art attempts have been made to modify conventional nickel catalysts in order to improve their stability. Yamazaki and coworkers (Yamazaki), *Preprint 7th China-Japan-USA Symposium on Catalysis*, Tokyo (1995) reported attempts at promoting conventional nickel catalysts with alkali, or by replacing an alumina support with other supports such as lanthana, La₂O₃, or by preparing a catalyst from a solid solution of nickel magnesium oxide that is reduced above 800° C. or by adding sulfur-containing compounds to the feed. These catalysts which incorporated amorphous supports were used for methane reforming with steam and CO₂. Chang and coworkers (Chang), *Studies in Surface Science and Catalysis*, 84 (1994), similarly studied the use of zeolite-supported nickel catalysts for use in the CO₂ reforming of methane carried out in conjunction with steam reforming. Pentasil zeolite-supported nickel catalysts which form tremedous coke when used in combined CO₂ and steam reforming processes were prepared by solid-state reaction and impregnation methods. Neither Yamazaki nor Chang, however, teach or suggest the use of these nickel catalysts for the CO₂-reforming of methane without the use of steam.

Prior art attempts at replacing steam by carbon dioxide in the reforming reaction with various catalysts, as reported in Rostrup-Nielsen, *Natural Gas Conversion II*, (H. E. Curry-Hyde and R. F. Howe (Editors), Elsevier, pp. 25–41, (1994), assume that there is no drastic impact on the reaction mechanism, but the authors state that the risk of carbon formation is increased. It is reported, however, that use of noble metal catalysts, sulfur-passivated nickel catalysts, and CO₂-addition to autothermal reforming may solve this problem by depressing carbon formation in spite of thermodynamic potential. Several factors limit the teaching of this reference when considering the use of catalysts other than those containing nickel, with different support structures, especially when they are considered for use in the CO₂-reforming of methane. First, although this research on noble metals was reported to include both rhodium and ruthenium, only data for ruthenium are presented. Second, the only catalysts used were those in which the metal was deposited on amorphous supports. Third, although rhodium and ruthenium are superior to nickel when used on amorphous oxide supports in steam reforming, rhodium and ruthenium as catalysts on amorphous oxide supports become less desirable when increasing amounts of steam are replaced with CO₂ to perform combined CO₂ and steam reforming.

With regard to CO₂-reforming of methane without steam, this reaction was first studied by Fischer and Tropsch in 1928 using nickel and cobalt based catalysts. This reaction was later commercialized as the Calcor process for which rhodium over amorphous oxide supports is one of the most effective catalysts. Tsipouriari et al., *Catalysis Today*, 21 (1994) reported that the performance of rhodium catalysts on various amorphous supports, under conditions of carbon dioxide reforming of methane, is a strong function of the carrier employed to disperse the metal. A strong carrier effect on the initial specific activity, deactivation rate and carbon accumulation was also found to exist. Other authors, including Erdoheyli et al., *J. of Catalysis* 141 (1993); Richardson et al., *Applied Catalysis*, 61 (1990); Nakamura et al, *Catalysis Letters* 25 (1994); and Solymosi et al., *Catalysis Letters* 11 (1991); similarly studied the efficiency of rhodium catalysts having amorphous supports on the $CO_2$-reforming of methane.

Rostrup-Nielsen et al., *J. Catal.* 144 (1993) compared catalysts based on nickel, ruthenium, rhodium, palladium, iridium, and platinum incorporated on an amorphous support for combined $CO_2$ and steam reforming of methane by studying the equilibrium for methane decomposition, the activity for reforming, and carbon formation, as well as the selectivity for carbon formation. The authors reported that ruthenium and rhodium showed high selectivity for carbon-free operation which were ascribed to high reforming rates combined with low carbon formation rates.

SUMMARY OF THE INVENTION

The present invention relates to a process for the carbon dioxide reforming of methane in the presence of a catalyst to produce a synthesis gas comprising hydrogen and carbon monoxide.

The process comprises contacting methane and $CO_2$ in the presence of an effective amount of rhodium incorporated onto a natural or synthetic crystalline zeolite having a silicon to aluminum ratio of greater than or equal to about 1.0 under reforming conditions sufficient to produce a product mixture comprising hydrogen, carbon monoxide, methane and $CO_2$. The product mixture is separated to recover the synthesis gas. Optionally, the product mixture which contains unreacted reactants can be recycled for further reaction.

The catalysts of the present process comprise crystalline zeolite supports having a silicon to aluminum ratio of greater than or equal to about 1.0 wherein the zeolite support is exchanged with a rhodium catalyst cation. In a preferred embodiment, the $CO_2$ reforming of methane is performed in the presence of a NaY zeolite support which incorporates a Rhodium catalyst. The invention provides a significant and unexpected improvement over the prior art amorphous oxide-supported rhodium catalysts used in combined $CO_2$ and steam reforming reactions in that the $CO_2$ reforming of methane according to the present invention is conducted in the absence of steam.

DETAILED DESCRIPTION OF THE INVENTION

Figure 1:
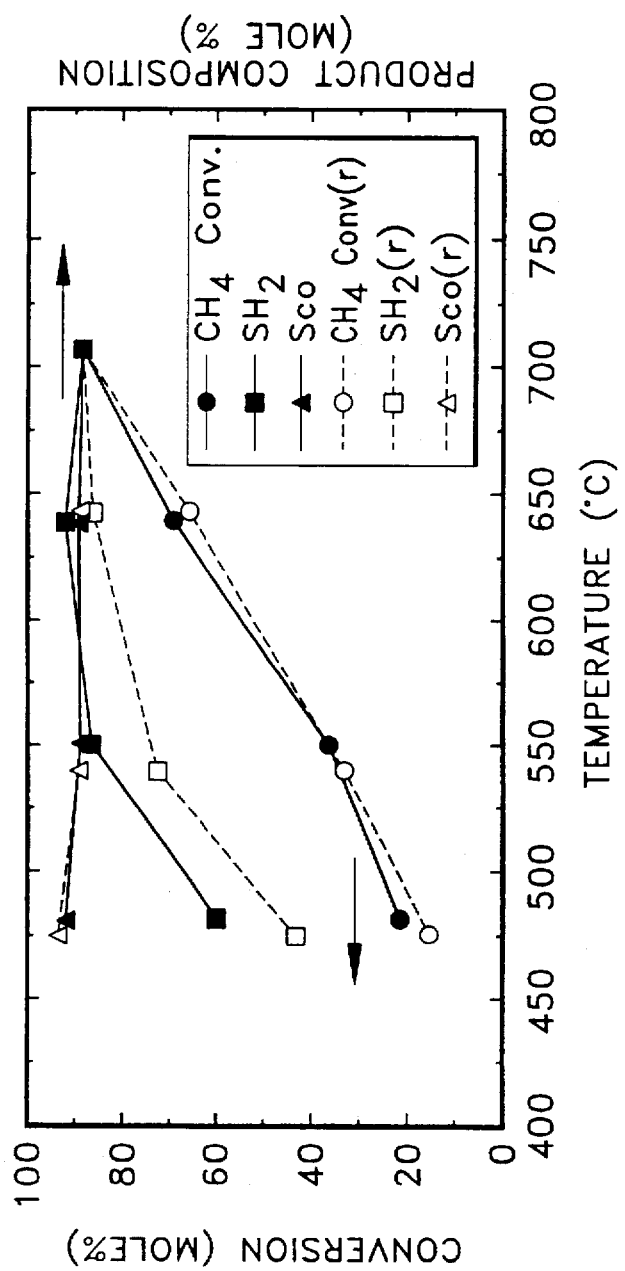
FIG. 1 shows the conversion of methane to syngas according to the present invention by the $CO_2$ reforming reaction in the presence of 7.2% Rh/NaY as a function of temperature.

The present invention relates to a process for the carbon dioxide reforming of methane which comprises contacting $CO_2$ and methane in the presence of an effective amount of rhodium incorporated into a zeolite under conditions of temperature, pressure, and contact time to yield a synthesis gas, comprising hydrogen and carbon monoxide, which is then recovered. The process utilizes a unique and unobvious combination of catalyst namely, rhodium, with crystalline zeolites to enable a process for the $CO_2$ reforming of methane capable of producing a syngas having a $H_2$/CO ratio approaching unity. This process, which is performed without steam, represents a significant advance over prior art reforming processes which typically are incapable of achieving the conversion of methane into syngas in the absence of steam.

Prior to this invention, no catalytic process employed rhodium catalysts incorporated into crystalline zeolite supports for the $CO_2$ reforming of methane. For example, prior art processes using supported rhodium catalysts utilized non-zeolite supports such as inorganic amorphous oxides including alumina, silica, and titania. Moreover, these supported rhodium catalysts were used not for $CO_2$ reforming, but rather for the steam reforming of methane to produce a syngas composition having a $H_2$/CO ratio far in excess of three.

Applicants have unexpectedly discovered that the $CO_2$ reforming of methane, without steam, can be performed in the presence of certain rhodium catalysts incorporated into zeolites. More particularly, Applicants have discovered that these zeolites when used in the $CO_2$ reforming of methane are quite stable and yield a $H_2$/CO ratio approaching unity. The combination of the defined rhodium metal catalysts incorporated onto zeolite supports when used in the $CO_2$ reforming reaction of methane overcomes problems associated with conventional supported catalysts (e.g., Ni/Al$_2$O$_3$) which are unable to function under conditions of low steam content because carbon is deposited as a result of the Boudouard reaction discussed above. The $CO_2$ reforming process according to the present invention is performed in the absence of steam in the feed to give high conversions of methane and high selectivity to syngas to achieve a $H_2$/CO ratio approaching unity.

According to the present invention the incorporation of rhodium into a zeolite support results in a stable catalyst having high activity. It is the combination of the zeolite support with the active rhodium metal catalyst component which facilitates the $CO_2$ reforming process according to the present invention. It is believed that the structure of certain zeolites used as a support maintain rhodium metal particles in zeolite cages separated from one another such that migration and agglomeration of the metal particles is prevented. The maintenance of a high metal dispersion is an important aspect with regard to catalyst chemistry as catalysts act only via their exposed surface atoms. As a result of the ability of the zeolite supports to maintain this dispersion of the rhodium metal catalyst, lower rhodium metal loadings (e.g., less than 1 wt % by weight of Rhodium) may be achieved without a substantial loss in catalytic activity and stability.

Although NaY and ZSM-5 zeolites discussed below are given as examples of supports useful in the present invention, it is to be understood that these are only illustrative. Applicants contemplate that other zeolite supports may be used including all those analogs which when used in conjunction with rhodium metal provides a zeolite-supported rhodium catalysts which is highly active, selective and stable under a wide range of process parameters such as temperature, feed composition, and space velocities. Applicants further contemplate that the zeolite supports useful in the rhodium catalysts according to the present invention may be either in the alkali metal form, e.g., the sodium or potassium form; the ammonium form; the hydrogen form or another univalent or multivalent cationic form. Suitable crystalline zeolites include those materials which are stable under the described reaction conditions and which have a pore size sufficient to effect the subject reaction.

Zeolite supports to be metal-exchanged may include, but are not limited to, MOR, MFI and FER structured zeolites. Representative zeolites under the MOR designation include mordenite, Na-D, Ptilolite and Zeolon. Representative zeolites under the MFI designation include ZSM-5, Silicalite-1, Silicalite, Zeta-1, Zeta-3, Faujasite and AZ-1. Representative zeolites under the FER designation include ferrierite, SR-D, Fu-9, NU-23 and ZSM-35.

Typically, the pore size of the base zeolite will range from about 4 to 8 angstroms although such a range is not to be construed as limiting the scope of this invention. The sodium form of ZSM-5 can be prepared by the procedures disclosed in U.S. Pat. No. 3,702,886, I & EC 24, 507 (1985) and Shiralkar, et. al., *Zeolite*, 9, 363, (1989), the disclosures which are specifically incorporated by reference herein.

The term mordenite is meant to include those synthetic and naturally occurring zeolites having the mordenite topology as included under the general International Union of Pure and Applied Chemistry (IUPAC) structure code of mordenite (MOR). Due to mordenite's unidimensional pore structure, small amounts of impurities can exert enormous effects on adsorption rates and capacities. While naturally occurring mordenites vary widely in purity, the synthetic zeolites tend to have higher purity and controlled pore structure thereby rendering the synthetic mordenites better suited for catalytic applications. The preferred mordenite catalysts suitable for practicing this invention have a silicon to aluminum ratio of greater than about 4.5.

Mordenite can be synthesized from a wide variety of starting materials of both chemical and natural origins. Synthetic mordenites are typically produced with Si/Al ratios ranging from about 4.5 to 12.5. Mordenite is a porous crystalline zeolite having a rigid three-dimensional anionic network with intracrystalline channels whose narrowest cross section has essentially a uniform diameter. Mordenite is distinguished over crystalline alumino-silicate clays such as bentonite which have a two-dimensional layered structure and over amorphous oxides such as alumino-silicates.

Applicants contemplate that the original alkali metal cations of the zeolites according to this invention may be replaced with rhodium metal in accordance with techniques well known in the art such as ion-exchange, impregnation, acid-base and solid state reactions with such methods being included, but not limited to, those methods broadly referred to throughout this specification and appended claims as "incorporation." For example, the alkali metal cations of the zeolite can be replaced, at least in part, by ion-exchange with from about 0.1 wt % to about 15 wt % (based upon the total weight of the salt) of rhodium. This procedure may be accomplished by contacting the sodium form of mordenite with a solution of a salt of the desired metal. The metal will be incorporated by ion exchange into the mordenite catalyst when the metal is in the form of a cation. All or part of the sodium ions can be replaced by the metal cations. Alternately, ion exchange can be effected by solid state or vapor phase whereby the $H^+$ form of the zeolite is reacted with a metal halide salt (MX) or a metal oxide to liberate HX or water and to place the rhodium metal into the exchange site.

The Ion-exchange technique is the preferred method for producing the Rh catalysts used according to the process of the present invention. Rhodium is believed to be incorporated in this manner into the NaY lies on ion-exchangeable sites which results in the Rhodium being well-dispersed in this high surface area support to yield better activity, selectivity and stability of the Rhodium catalyst in the $CO_2$ reforming of $CH_4$.

A suitable metal-exchange technique comprises contacting the acid form of a zeolite with a solution which contains a salt of the desired replacing cation or cations. Examples of suitable salts include the halides such as chlorides, nitrates, carboxylates and sulfates.

If impregnation of the zeolite is employed as the method of incorporation of the rhodium metal catalyst, the amount of rhodium impregnated into the zeolite support ranges from about 0.01 to 15 wt %, and preferably between about 0.1 to 8 wt % based upon the total weight of the zeolite support. However, the level of impregnation should not be such that substantially all of the pores on the zeolite catalyst become clogged thereby rendering the catalyst inactive for the subject process.

The quantity of rhodium to be incorporated into the zeolite support will also vary depending upon the reactivity of the catalyst and the reactants used. An effective amount of catalyst is used, i.e., that amount which causes the $CO_2$ reforming of methane to selectively produce the desired syngas at suitable conversion at the temperature and pressures used. For a batch reaction, an effective amount of rhodium typically ranges from about 0.1 to 7 wt % based upon the total amount of catalyst present in the reaction mixture, and preferably is an amount of about 0.5 to 0.93 wt %. Within these ranges though, the level of catalyst is somewhat empirical and is adjusted depending on the product desired.

The rhodium-containing catalysts useful in this invention may optionally be subjected to thermal treatment prior to use in the process although such treatment is not required to practice the invention. The thermal treatment may be conducted in the reactor prior to contacting the reactants with the catalyst or as a separate step. The thermal treatment may comprises heating the catalysts of this invention to above ambient temperature, preferably between about 80° C. and 150° C., while under an inert atmosphere of about 1 to 220 atmospheres for a period ranging from about 0.5 to 12 hours to remove residual moisture. The catalyst may be dried during one or more periods utilizing one or more discrete temperatures or temperature ramping techniques known in the art. The amount of time and temperature regime employed to dry the catalyst is not critical to the invention.

The amount of catalyst to be utilized in the present process varies depending upon the reaction conditions (i.e., temperature, pressure and the like). An effective amount of catalyst is used, i.e., that amount which causes a $CO_2$ reforming reaction of methane to selectively produce the desired syngas product. For a batch reaction, an effective amount of zeolite supported rhodium typically ranges from about 0.1 to about 7.3 wt % based upon the amount of $[Rh(NH_3)_5Cl]Cl_2$ used. The catalysts obtained by incorporating rhodium into zeolites can be fabricated onto ceramic or metal supports known in the art. A suitable support has a honey-comb design whereby surface area is maximized to enhance catalytic activity.

The $CO_2$ reforming of methane can be conducted in the presence of the catalysts described above under a broad range of conditions. Typically, such reaction is run at temperatures ranging from about 400° C. to about 900° C. and pressures between about 1 and about 10 atmospheres. The process can be conducted in a batchwise or continuous mode. When the process is conducted under continuous mode, the recycle steam will contain a mixture of CO and water in which case water does not adversely affect the activity of the catalyst. Continuous fixed bed reactions can be advantageously run at a space velocity, expressed as gas hourly space velocity, (GHSV) and may be varied between from about 1,000 to about 100,000 hr$^{-1}$ (based on methane feed) to achieve desired conversion levels. The reactor was surrounded by a temperature-controlled furnace. The temperature was monitored by a chromel-alumel thermocouple which was in contact with the catalyst bed.

Typical reaction times for batch reactions range from about 10 to about 120 hours. Identification and separation of the synthesis gas can be accomplished by conventional techniques including gas chromatography and gas chromatography/mass spectrometry.

The following examples are provided to further illustrate various embodiments of this invention and to provide a comparison between the enumerated catalysts of this invention and prior art rhodium-containing catalysts. These examples are provided to illustrate the nature of the process described herein and are not intended to limit the scope of the claimed invention. Unless otherwise stated, parts and percentages in the examples are given by weight.

EXAMPLES 1–5
Preparation of Zeolite-Supported Rhodium Catalyst

Rhodium catalysts of the type capable of being used in the process of the present invention were prepared by the ion-exchange technique using rhodium pentamine aquo complex, [Rh[(NH$_3$)$_5$Cl]Cl$_2$·6H$_2$O)] as the rhodium precursor and zeolite molecular sieves as the support. The support used for Examples 1—3 was zeolite NaY having a ratio of Si/Al=2.6 and commercially available from Union Carbide, Chickasaw, Ala. The support used for Examples 4–5 was ZSM-5 having a ratio of Si/Al=17.1 which is commercially available from UOP, Tarrytown, N.Y. This procedure for preparing the catalysts was conducted in two stages. First, a dilute solution of [Rh[(NH$_3$)$_5$Cl]Cl$_2$(≈0.002 M) was slowly added to a zeolite slurry (having a density of 3 g/L; at a temperature of 80° C.) over a period of 12 hours. Second, the slurry was stirred for an additional 60 hours; filtered; washed thoroughly with deionized water; and then oven-dried at 120° C.

Upon chemical analysis of samples produced by the above method, the metal loading on the support was determined to be in the range of between 0.1 to 7.0 wt %. These catalyst samples were tested for their activity in accordance with the Test Procedure set forth below.

COMPARATIVE EXAMPLES 6–9
Preparation of Amorphous Inorganic Oxide-Supported Rhodium Catalysts To evaluate the effect of the zeolite support when used with rhodium, comparative rhodium catalyst examples having amorphous inorganic oxide supports were produced by impregnating alumina (Aerosil Al$_2$O$_3$) and silica (Aerosil 200 SiO$_2$) molecular sieves, which are commercially available from Degussa, Ridgefield Park, N.J., using well-known impregnation techniques as set forth by Solymosi et al., *Catalysis Letters* 11 (1991), which is incorporated herein by reference. The Al$_2$O$_3$ support had an average particle size of 13 nm with a surface area of 85–115 m$^2$/g. The SiO$_2$ support had an average particle size of 12 nm with a surface area of 175–225 m$^2$/g. These catalyst samples were tested for their activity in accordance with the Test Procedure set forth below.

COMPARATIVE EXAMPLES 10–11
Preparation of Zeolite-Supported Non-Rhodium Metal Catalyst To evaluate the effect of the rhodium as the catalyst when used in conjunction with a zeolite support, comparative nickel and nickel-cobalt catalyst samples on zeolite supports were produced by conventional impregnation techniques.

These catalyst samples were tested for their activity in accordance with the Test Procedure set forth below.

TEST PROCEDURE FOR EVALUATING CATALYSTS IN THE CO$_2$ REFORMING OF METHANE TO PRODUCE SYNTHESIS GAS

The following general procedure was utilized for effecting the CO$_2$ reforming of methane to produce synthesis gas in the presence of the subject catalysts.

A continuous flow quartz reactor was charged with powdered catalyst samples and calcined at 450° C. in air at a flow rate of 100 mL/min over a period of 12 to 16 hrs. The weight of the powdered catalyst samples used in these tests varied from a tenth of a gram to one gram. The reactor had a separate inlet for admixing CO$_2$ with the CH$_4$ at a position to enable thorough mixing just prior to contacting the reactants with the desired catalyst. Ultra pure reactants were used in all the experiments with reaction conditions held constant using the following feedstream: [CH$_4$]=20%; [CO$_2$]=20%; [Ar]=60%; and a GHSV of 10,000 hr$^{-1}$.

On-line analyses of the effluent gas was periodically performed using a gas chromatograph with all the catalyst samples being evaluated after ≈30 minutes of time on stream (TOS) when the temperature had reached the set point.

The activity measurements were made with a microcatalytic reactor in a steady-state flow mode. Product analysis was obtained using an on-line gas chromatograph with a thermal conductivity detector. The separation column was packed with silica gel (60/80 mesh) and was 8 feet long having a ⅛" outer diameter. Chromatograph temperature was 60° C. and the flow rate of the carrier gas was 30 cm$^3$/min.

The catalysts of Examples 1 through 11 were tested according to the Test Procedure outlined above. The results for Examples 1–5 illustrating the CO$_2$ reforming of methane in the presence of rhodium incorporated zeolites according to the present invention are shown in Table 1 below. Also shown in Table 1 are the results for Examples 6–11 illustrating CO$_2$ reforming of methane in the presence of rhodium on amorphous oxide supports and in the presence of zeolites into which a metal other than rhodium was incorporated.

TABLE 1

CO$_2$ REFORMING OF METHANE IN PRESENCE OF CATALYSTS AT T = 773° C., P = 1 ATM

| Example # | Catalyst | % CH$_4$ Conversion | H2/CO |
|---|---|---|---|
| 1 | 0.1% Rh/NaY | 10 | 0.75 |
| 2 | 0.5% Rh/NaY | 20 | 0.78 |
| 3 | 0.93% Rh/NaY | 30 | 0.92 |
| 4 | 1% Rh/NaZSM-5 | 28 | 0.89 |
| 5 | 1% Rh/NaZSM-5 (N) | 34 | 0.93 |
| 6 | 1% Rh/Al$_2$O$_3$ | 23.4 | 0.42 |
| 7 | 1% Rh/Al$_2$O$_3$ | 21.7 | 0.38 |
| 8 | 1% Rh/SiO$_2$ | 10 | 0.55 |
| 9 | 1% Rh/SiO$_2$ | 21 | 0.61 |
| 10 | 5% Co O/NaZSM-5 | 15 | 0.76 |
| 11 | Co—Ni—O/NaZSM-5 (N) | 25 | 0.845 |

The results presented in Table 1 show the performance of the process of the present invention wherein rhodium-loaded zeolite catalysts, indicated as xRh/NaY and xRh/NaZSM-5, (where x is the Rh loading in weight percent by weight of the catalyst) are used. As shown in Table 1 process using rhodium-loaded catalysts having amorphous oxide supports and other metal-loaded zeolite catalysts impregnated with cobalt or cobalt and nickel are not as effective. As can be seen from Table 1 processes using the Rh/NaY and Rh/ZSM-5 catalysts result in the highest conversion of methane with a $H_2/CO$ ratio near the theoretical value of unity predicted by equation (3) above.

Table 1 illustrates that in terms of activity and selectivity, the preferred process employs catalysts between 0.5–0.93 wt % Rh/NaY with the most preferred being 0.5 wt % Rh/NaY as this resulted in a 90% methane conversion with a $H_2$ to CO ratio of about 1. The results obtained for Rh/NaY catalysts having various weight loadings of Rhodium, however, show that even the zeolite catalysts containing less than 1 wt % are effective with 0.5 wt % Rhodium loaded NaY zeolite yielding a 20% conversion and a 0.1 wt % Rhodium loaded NaY zeolite yielding a 10% conversion.

The effectiveness of the processes according to the invention is indicated by the stability of the catalysts, i.e., the lack of deactivation, after 30 hours time on stream using 0.93% Rh/NaY in ascending and descending order of temperature and by operating multiple cycles at each temperature. Thus, even after 20 cycles the catalyst was fully stable, giving $H_2/CO$ ratios close to unity, with the results being fully reproducible.

FIG. 1 shows the stability of the Rh/NaY catalyst as a function of operating temperature of the reforming process according to the present invention. This is in sharp contrast with the process using the amorphous oxide supported rhodium catalysts which only gave $H_2/CO$ in the range of 0.4–0.6. Furthermore, the oxide supported rhodium catalysts showed signs of deactivation. As can be seen, upon temporarily increasing the temperature from 470° C. to 720° C. and then lowering the temperature to the original value, no decrease in activity is observed when using a 7.2 wt % Rh/NaY catalyst.

Figure 2:
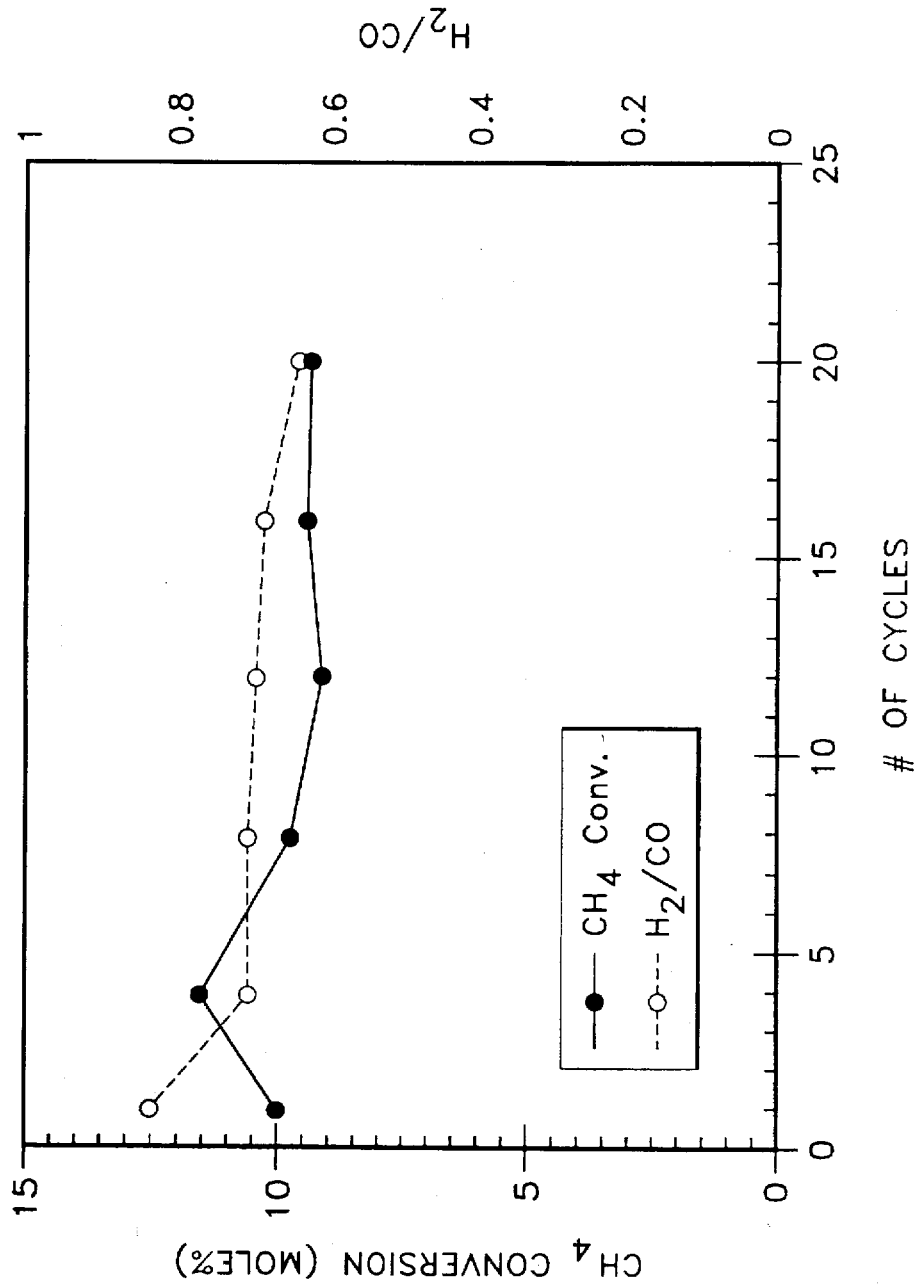
FIG. 2 shows the conversion of methane to syngas according to the present invention by the $CO_2$ reforming reaction in the presence of 0.1% Rh/NaY as a function of cycling temperature between 500° C. to 650° C.

FIG. 2 shows the stability of the Rh/NaY catalyst as a function of cycling operating temperatures of the reforming process. As can be seen, upon repeatedly cycling the temperature between 500° C. and 600° C. for 20 cycles, no decrease in activity is observed when using a 0.1 wt % Rh/NaY catalyst.

To analyze for the formation of carbonaceous deposits, Rh/NaY samples used in the catalytic runs shown in Table 1 were cooled in helium and were subjected to a temperature programmed oxidation test using an ion selective mass spectrometer. No carbon deposition was detected on these samples. The stability of the catalysts was confirmed by the absence of a CO and/or $CO_2$ signal indicating that no carbonaceous layers had been deposited on the catalyst.

The enumerated catalysts of the present invention provide several improvements over prior art processes for producing syngas wherein $CO_2$ is used in the absence of steam. First, the claimed catalysts are unexpectedly more active and selective than prior art catalysts in the $CO_2$ reforming of methane; second, the catalysts are not deactivated in the absence of steam; and third, the subject catalysts are not prone to carbon deposits when used in the absence of steam.

The advantages afforded by the present invention over conventional syngas production processes is that the present process is particularly advantageous for applications where small amounts of unconverted methane are tolerable. The $CO_2$ reforming of methane process of the present invention is particularly suited toward being integrated into the production of methanol given the stoichiometry of the resultant syngas. Additionally the process according to he present invention is also advantageous for use with natural gas reservoirs containing $CO_2$.

Having thus described the present invention, what is now deemed appropriate for letters patent is set forth in the following claims.

We claim:

1. A process for $CO_2$ reforming of methane to produce a synthesis gas which comprises the steps of:

(a) contacting methane and $CO_2$ in the presence of an effective amount of rhodium incorporated onto a zeolite under conditions of temperature, pressure, and contact time to yield a product mixture comprising methane, $CO_2$, carbon monoxide and hydrogen; and (b) separating the product mixture to recover the synthesis gas.

2. The process according to claim 1 wherein said contacting step is carried out at a temperature between 400° C. and 900° C.

3. The process according to claim 1 wherein said contacting step is carried out at a pressure of from about 1 Atm to about 10 Atm.

4. The process according to claim 1 wherein said contacting step is carried out in the presence of a zeolite loaded with from 0.1% to 7% rhodium.

5. The process according to claim 1 wherein said contacting step is carried out at a gas hourly space velocity of about 1,000 to about 100,000 $hr^{-1}$.

6. The process according to claim 1 wherein the recovered synthesis gas has a hydrogen to carbon monoxide ratio of about 1.

7. The process according to claim 1 wherein the the zeolite is selected from the group consisting of a MOR, MFI or FER structure type zeolite.

8. The process according to claim 7 wherein the MOR structure type zeolite is selected from the group consisting of mordenite, Na-D, Ptilolite and Zeolon.

9. The process according to claim 7 wherein the MFI structure type zeolite is selected from the group consisting of ZSM-5, Silicalite-1, Silicalite, Zeta-1, Zeta-3, Faujasite and AZ-1.

10. The process according to claim 7 wherein the FER structure type zeolite is selected from the group consisting of ferrierite, SR-D, Fu-9, NU-23 and ZSM-35.

11. The process according to claim 7 which further comprises recycling the product mixture of step (b) for further contacting in step (a).

* * * * *

UNITED STATES PATENT AND TRADEMARK OFFICE
CERTIFICATE OF CORRECTION

PATENT NO. : 5,753,143
DATED : May 19, 1998
INVENTOR(S) : Bhat, et al.

It is certified that error appears in the above-identified patent and that said Letters Patent is hereby corrected as shown below:

On the title page, item [54] and Column 1,

In the title, after "Rhodium" insert --Loaded--.

Signed and Sealed this

Ninth Day of February, 1999

Attest:

Attesting Officer

*Acting Commissioner of Patents and Trademarks*